(12) United States Patent
Briffaud et al.

(10) Patent No.: US 12,060,516 B2
(45) Date of Patent: Aug. 13, 2024

(54) POLYAMIDE-BASED COMPOSITION FOR PIPES CONTAINING OIL OR GAS

(71) Applicant: ARKEMA FRANCE, Colombes (FR)

(72) Inventors: Thierry Briffaud, Bernay (FR); Philippe Blondel, Bernay (FR); Patrick Dang, Saint-Leger-de-Rotes (FR); Francois Fernagut, Le Val David (FR); Jean-Jacques Flat, Goupillieres (FR); Benjamin Saillard, Bernay (FR)

(73) Assignee: ARKEMA FRANCE, Colombes (FR)

( * ) Notice: Subject to any disclaimer, the term of this patent is extended or adjusted under 35 U.S.C. 154(b) by 1220 days.

(21) Appl. No.: 16/088,341

(22) PCT Filed: Apr. 7, 2017

(86) PCT No.: PCT/FR2017/050840
§ 371 (c)(1),
(2) Date: Aug. 14, 2020

(87) PCT Pub. No.: WO2017/174949
PCT Pub. Date: Oct. 12, 2017

(65) Prior Publication Data
US 2020/0377773 A1 Dec. 3, 2020

(30) Foreign Application Priority Data
Apr. 8, 2016 (FR) ..................................... 16 53122

(51) Int. Cl.
| | | |
|---|---|---|
| *C09K 3/12* | (2006.01) | |
| *C08G 69/14* | (2006.01) | |
| *C08G 69/34* | (2006.01) | |
| *C08G 69/36* | (2006.01) | |
| *C08L 77/02* | (2006.01) | |
| *C08L 77/06* | (2006.01) | |

(52) U.S. Cl.
CPC ................ *C09K 3/12* (2013.01); *C08G 69/14* (2013.01); *C08G 69/34* (2013.01); *C08G 69/36* (2013.01); *C08L 77/02* (2013.01); *C08L 77/06* (2013.01); *C08G 2190/00* (2013.01); *C08G 2250/00* (2013.01); *C08L 2203/18* (2013.01)

(58) Field of Classification Search
CPC ........... C09K 3/12; C08L 77/02; C08L 77/06; C08G 69/34; C08G 69/36; C08G 69/14
USPC ......................................................... 523/177
See application file for complete search history.

(56) References Cited

U.S. PATENT DOCUMENTS

| | | | |
|---|---|---|---|
| 2010/0105812 A1 | 4/2010 | Bussi et al. | |
| 2010/0183837 A1 | 7/2010 | Hochstetter et al. | |
| 2011/0206881 A1 | 8/2011 | Briffaud et al. | |

FOREIGN PATENT DOCUMENTS

| | | | |
|---|---|---|---|
| CA | 2347258 A1 | 4/2000 | |
| FR | 1395076 A | 4/1965 | |
| FR | 3010408 A1 | 3/2015 | |
| JP | 2006192743 A | 7/2006 | |
| WO | 2006047775 A2 | 5/2006 | |
| WO | 2007044573 A1 | 4/2007 | |
| WO | 2008104719 A2 | 9/2008 | |
| WO | 2008122743 A2 | 10/2008 | |
| WO | 2010015785 A1 | 2/2010 | |
| WO | WO-2010015785 A1 * | 2/2010 | ............... B32B 1/08 |
| WO | 2011073308 A1 | 6/2011 | |

OTHER PUBLICATIONS

International Search Report (PCT/ISA/210) mailed on Aug. 11, 2017, by the European Patent Office as the International Searching Authority for International Application No. PCT/FR2017/050840.
Written Opinion (PCT/ISA/237) mailed on Aug. 11, 2017, by the European Patent Office as the International Searching Authority for International Application No. PCT/FR2017/050840.
Wypych, "Handbook of Plasticizers", Dec. 2003, ChemTec Publishing, XP055394360, pp. 299-299.

* cited by examiner

*Primary Examiner* — Deve V Hall
(74) *Attorney, Agent, or Firm* — Boone IP Law

(57) ABSTRACT

The invention relates to the use of a composition comprising at least one polyamide, of which at least one is a semicrystalline copolyamide comprising at least one minor motif resulting from the polycondensation of: at least one diamine with at least one polymerised fatty acid, in particular a fatty acid dimer; or at least one diamine dimer with at least one carboxylic acid; or at least one amino acid dimer; or mixtures of same, as a sealing coating in a pipe containing oil or gas, said pipe being used in the operation of offshore oil or gas deposits.

29 Claims, 4 Drawing Sheets

POLYAMIDE-BASED COMPOSITION FOR PIPES CONTAINING OIL OR GAS

The present invention relates to the use of a composition comprising at least one semicrystalline copolyamide comprising at least one minor unit derived in particular from the polycondensation of at least one diamine with a fatty acid dimer, as a leaktight layer in a pipe, in particular a hose pipe, containing oil or gas, this pipe being used in the exploitation of undersea (offshore) oil or gas deposits.

The invention also relates to the structures or pipes obtained from said compositions.

The exploitation of offshore oil deposits subjects the materials employed to extreme conditions, in particular the pipes connecting the various undersea devices of the platform and conveying the hydrocarbons extracted, which are generally transported at high temperature and high pressure (for example 700 bar).

During the operation of the plants, acute problems of mechanical strength, thermal resistance and chemical resistance of the materials employed are thus posed. Such pipes must in particular withstand oil which is hot, gas, water and mixtures of at least two of these products for periods of time which may be up to 20 years.

Conventionally, these pipes comprise a nonleaktight inner metal layer formed by a helically wound profiled metal strip, such as an interlocked metal strip. This inner metal layer, which gives shape to the pipe, is coated, generally by extrusion, with a polymer layer intended to confer leaktightness. Other protective and/or reinforcing layers, such as plies of metal fibers, thermoplastics and rubbers, may also be positioned around the leaktight polymer layer.

The leaktight polymer sheath covering the carcass generally has specifications that are particularly difficult to meet since it ensures the leaktightness of the hose pipes while it is in direct contact with the products transported at elevated pressure and temperature. This sheath must mainly:
- be able to be extruded continuously, optionally on the inner carcass support,
- be flexible enough to accept bends imposed on the hose during the operations of manufacturing, installing and using the hose on the site (movement of the sea swell or raising of the hose for a change of worksite),
- withstand creep following pressure exertions, aggravated by the temperature level. Creep takes place in the butt spaces (space or gap) between the metallic armorings (for example T or interlocked auto zeta) on which the sheath bears when the conduit is pressurized by the transported effluent,
- be sufficiently chemically stable so that its mechanical characteristics and its leaktightness do not prohibitively degrade during the service life of the hose.

For working temperatures below 40° C., the polymer is crosslinked or noncrosslinked HDPE (high-density polyethylene). For temperatures above 40° C., polyamide is used and, for temperatures above 90° C., PVDF (polyvinylidene fluoride) is employed.

In view of the high cost of PVDF, and despite the implication of higher temperatures than those recommended, the choice of the polymer has fallen on polyamides, such as PA11 and PA12, which are well known for their good thermal behavior, their chemical resistance, in particular toward solvents, their resistance to bad weather and to radiation, their impermeability to gases and liquids, and their nature as electrical insulators.

These polyamides are already commonly used in the manufacture of pipes intended to convey hydrocarbons extracted from undersea (offshore) or onshore oil deposits, but, nevertheless, have the drawback of aging too quickly.

Patent FR 1 395 076 describes compositions based on dimerized fatty acids with low absorption of water. The illustrated compositions contain a very high mole fraction of dimerized fatty acid. Neither the resistance to hydrolysis nor the offshore application is mentioned.

International patent applications WO 2006/047775 and WO 2007/044573 both describe hydrolysis-resistant copolyamide compositions containing minor comonomers containing an aromatic or alicyclic ring. However, these compositions do not make it possible to significantly improve the resistance to hydrolysis of PA11.

International patent application WO 2008/104719 describes A/(Cz diamine).(Cw diacid) compositions in which Cw may be a fatty acid dimer. These products are used as adhesives, and neither the resistance to hydrolysis nor the offshore application is mentioned.

Patent FR 3010408 describes copolyamides based on fatty acid dimers. Said patent claims a use for sports articles, but the offshore application is not mentioned.

The current polyamide compositions generally make possible only a working temperature of the pipes of 60° C. to 70° C., depending on the pH or on the total acid number (TAN) of the transported fluid and on the acceptance criterion used.

There is thus a need to find a compromise between these various parameters and moreover to increase the working temperature of the pipes and also to increase the thermal behavior while at the same time conserving good extrudability of the composition and the flexibility properties of the pipe.

A first subject of the invention is thus the use of a composition comprising at least one semicrystalline copolyamide comprising at least one minor unit derived in particular from the polycondensation of at least one diamine with a fatty acid dimer, as a leaktight layer in a pipe containing oil or gas, this pipe being used in the exploitation of undersea (offshore) oil or gas deposits.

A second subject relates to the structures or pipes obtained from said compositions.

Use

The present invention relates to the use of a composition comprising at least one polyamide, of which at least one of said polyamide is a semicrystalline copolyamide comprising at least one minor unit derived from the polycondensation:
- of at least one diamine with at least one polymerized fatty acid, in particular a fatty acid dimer, or
- of at least one diamine dimer with at least one dicarboxylic acid, or
- of at least one amino acid dimer,
in particular derived from the polycondensation:
- of at least one diamine with at least one polymerized fatty acid, in particular a fatty acid dimer, or
- of at least one diamine dimer with at least one dicarboxylic acid,
- or mixtures thereof,
as leaktight layer in a pipe containing oil or gas, this pipe being used in the exploitation of undersea (offshore) oil or gas deposits.

The inventors have found, entirely unexpectedly, that the use of a semicrystalline copolyamide comprising at least one minor unit based on a polymerized fatty acid or a diamine dimer or an amino acid dimer makes it possible to obtain compositions with good extrusion properties, better thermal behavior and also an improved working temperature of the pipes and thus better resistance to hydrolysis.

Throughout the description, unless otherwise indicated, all the percentages indicated are weight percentages.

The term "composition comprising at least one polyamide, at least one of which is a semicrystalline copolyamide comprising at least one minor unit . . . " means that the composition may comprise:
- a single polyamide, and in this case said polyamide can only be the semicrystalline copolyamide comprising at least one minor unit,
- two polyamides, and in this case one of the polyamides is the semicrystalline copolyamide comprising at least one minor unit and the other may be any other polyamide, namely a semicrystalline or amorphous, homopolyamide or copolyamide polyamide, or else both polyamides are semicrystalline copolyamides that are different from each other and comprising at least one minor unit,
- three polyamides, and in this case one of the polyamides is the semicrystalline copolyamide comprising at least one minor unit and the other two may be any other polyamide, namely a semicrystalline or amorphous, homopolyamide or copolyamide polyamide, or else two of the polyamides each correspond to a semicrystalline copolyamide that is different from the other polyamide and each comprising at least one minor unit, and the third polyamide corresponds to any other polyamide, namely a semicrystalline or amorphous, homopolyamide or copolyamide polyamide,
- more than three polyamides, and in this case the additional polyamide(s), relative to the preceding possibility with three polyamides, is (are) chosen from a semicrystalline copolyamide, different from the other semicrystalline copolyamide(s) and comprising at least one minor unit, and another polyamide, namely a semicrystalline or amorphous, homopolyamide or copolyamide polyamide different from the other(s).

Semicrystalline Copolyamide

The term "semicrystalline copolyamide" covers copolyamides which have both a glass transition temperature Tg and a melting point Tm. The Tg and the Tm may be determined, respectively, according to standards ISO 11357-2:2013 and 11357-3:2013.

The nomenclature used to define polyamides is described in the standard ISO 1874-1:1992 "Plastics—Polyamide (PA) molding and extrusion materials—Part 1: Designation", in particular on page 3 (tables 1 and 2), and is well known to those skilled in the art.

For the purposes of the invention, a semicrystalline copolyamide denotes a copolyamide which has a melting point (Tm) in DSC according to the standard ISO 11357-3 of 2013, and an enthalpy of crystallization during the cooling step at a rate of 20 K/min in DSC measured according to the standard ISO 11357-3 of 2013 which is greater than 30 J/g, preferably greater than 40 J/g.

The semicrystalline copolyamide comprises a minor unit which may be derived from the polycondensation of at least one diamine with at least one polymerized fatty acid, in particular a fatty acid dimer.

Consequently, said copolyamide has the structure A/X-polymerized fatty acid in which A is a unit which results from the condensation:
- of a C6 to C12 lactam,
- of a C6 to C12 aliphatic α,ω-aminocarboxylic acid,
- of a Ca diamine and a Cb diacid.

When the polyamide is a unit corresponding to the formula (Ca diamine).(Cb diacid), Ca and Cb denoting the number of carbon atoms in the diamine and the diacid, respectively, the (Ca diamine) unit is chosen from linear or branched aliphatic diamines, cycloaliphatic diamines and alkylaromatic diamines.

When the diamine is aliphatic and linear, of formula H2N—(CH2)a-NH2, the (Ca diamine) monomer is preferentially chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20) and docosanediamine (a=22).

When the diamine is aliphatic and branched, it may comprise one or more methyl or ethyl substituents on the main chain. For example, the (Ca diamine) monomer may advantageously be chosen from 2,2,4-trimethyl-1,6-hexanediamine, 2,4,4-trimethyl-1,6-hexanediamine, 1,3-diaminopentane, 2-methyl-1,5-pentanediamine and 2-methyl-1,8-octanediamine.

When the (Ca diamine) monomer is cycloaliphatic, it is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), bis(p-aminocyclohexyl)methane (PACM), isopropylidenedi(cyclohexylamine) (PACP), isophoronediamine (a=10), piperazine (a=4) and aminoethylpiperazine. It may also comprise the following carbon backbones: norbornylmethane, cyclohexylmethane, dicyclohexylpropane, di(methylcyclohexyl), di(methylcyclohexyl)propane. A nonexhaustive list of these cycloaliphatic diamines is given in the publication "Cycloaliphatic Amines" (Encyclopedia of Chemical Technology, Kirk-Othmer, 4th Edition (1992), pages 386-405).

When the (Ca diamine) monomer is alkylaromatic, it is chosen from 1,3-xylylenediamine and 1,4-xylylenediamine.

The (Cb diacid) unit is chosen from linear or branched aliphatic diacids, cycloaliphatic diacids and aromatic diacids.

Throughout the description, the terms "diacid", "carboxylic diacid" and "dicarboxylic acid" denote the same product.

When the (Cb diacid) monomer is aliphatic and linear, it is chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanedioic acid (b=18), octadecenedioic acid (b=18), eicosanedioic acid (b=20) and docosanedioic acid (b=22).

When the diacid is cycloaliphatic, it may comprise the following carbon backbones: norbornyl, cyclohexyl, dicyclohexyl, dicyclohexylpropane.

When the diacid is aromatic, it is chosen from terephthalic acid (denoted T), isophthalic acid (denoted I) and naphthalenic diacids.

X is a diamine as defined above for the Cb diamine.

The polymerized fatty acids denote compounds produced from coupling reactions of unsaturated fatty acids, which lead to mixtures of products bearing two acid functions (referred to as acid dimers) or three acid functions (referred to as acid trimers).

Polymerized fatty acids are commercially available, and in particular the product having the trade name Pripol® sold by the company Croda may be used, as may the product having the trade name Empol® sold by the company Cognis or the product having the trade name Unydime® sold by the company Arizona Chemical or the product having the trade name Radiacid® sold by the company Oleon.

After separation, the fatty acid dimers are obtained predominantly from 75% to more than 98% as a mixture especially with the monomer, the 1.5-mer and the corresponding trimer.

The fatty acid dimers may then be converted into amine dimers (by transformation of the two acid functions into amine functions) or into amino acid dimers (by transformation of one of the acid functions into an amine function).

The semicrystalline copolyamide comprises a minor unit which may also be derived from the polycondensation of at least one diamine dimer with at least one dicarboxylic acid.

Consequently, said copolyamide has the structure A/diamine dimer-Y in which A is as defined above. The diamine dimer originates from a fatty acid dimer in which the acid functions have been converted into amine functions.

Y represents a dicarboxylic acid as defined for the Cb diacid.

The semicrystalline copolyamide comprises a minor unit which may be derived from the polycondensation of at least one amino acid dimer.

Consequently, said copolyamide has the structure A/amino acid dimer in which A is as defined above. The amino acid dimer originates from a fatty acid dimer in which one of the acid functions has been converted into an amine function.

The composition of the invention is used as a leaktight layer for the manufacture of pipes containing oil or gas used in the exploitation of undersea (offshore) oil or gas deposits.

These pipes serve not only to ensure the connections between the seabed where the wellhead is located and the surface where the oil platform is located, which performs the processing and expedition of the production, but also to convey the effluent produced by wells, in the form of liquid or gaseous products, between a storage or processing site and the place of use.

These hose pipes thus transport the oil production and all the products that may be associated therewith (liquid crude oil and/or gas, at elevated temperature and pressure, and also other diverse fluids such as water, methanol, etc. originating from the well).

Consequently, the term "gas" denotes a combustible gas originating from the oil well and does not in any way concern air or a mixture with air.

The pipe of the invention is neither a pneumatic pipe transporting air nor a hydraulic pipe transporting oil, especially mineral oil.

The pipe of the invention is used in the exploitation of undersea (offshore) oil or gas deposits and therefore does not concern onshore pipes either.

Advantageously, when the composition comprises two or more polyamides, said semicrystalline copolyamide (or all of the copolyamides) comprising at least one minor unit is in major weight amount relative to the other polyamide.

In another embodiment, the present invention relates to the use of a composition as defined above, in which:
said minor unit comprises at least one of the following formulae:
either the residues of a fatty acid dimer of formula (I) below:

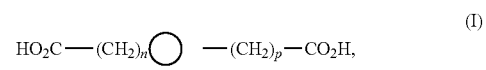

or the residues of a diamine dimer of formula (II) below:

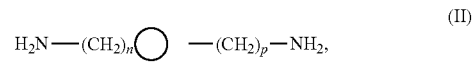

or the residues of an amino acid dimer of formula (III) below:

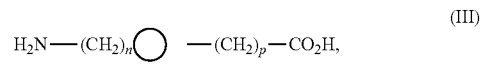

or a mixture thereof,
in which formulae, independently of each other:
n is from 1 to 10, in particular from 1 to 7,
p is from 1 to 10, in particular from 1 to 7,

corresponds to a structure chosen from:

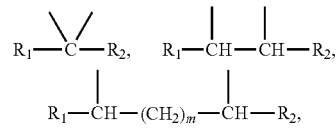

m being from 1 to 5,
in which $R_1$ and $R_2$ represent, independently of each other, H or a $C_1$ to $C_{12}$ and in particular $C_7$ to $C_{11}$ alkyl chain,
and

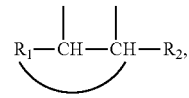

in which $R_1$ and $R_2$ are cyclized to form a structure:
i) with one ring of the type
cyclohexane:

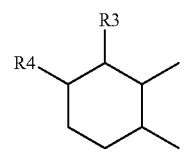

or phenyl:

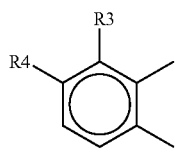

ii) with two rings of the 1,2,3,4-tetrahydronaphthalene type:

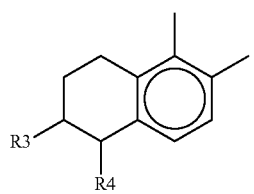

or of the bicyclo[4.4.0]decane type:

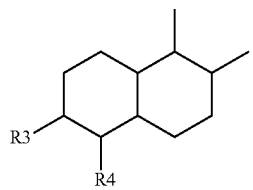

$R_3$ and $R_4$ being, in the one-ring or two-ring structures, C1 to C10 and in particular C7 to C9 alkyl residues, or a mixture thereof, the total number of carbon atoms in the diacid of formula (I), the diamine of formula (II) and the amino acid of formula (III) being greater than or equal to 30, in particular greater than or equal to 36, in particular 36.

Advantageously, n is from 5 to 7.
Advantageously, p is from 5 to 7.
Advantageously, n and p are from 5 to 7.

In one advantageous embodiment, the present invention relates to the use of a composition as defined above, in which:
  said polyamide is formed from a semicrystalline copolyamide, and
  said minor unit comprises at least one of the following formulae:
    either the residues of a fatty acid dimer of formula (I) below:

(I)

or the residues of a diamine dimer of formula (II) below:

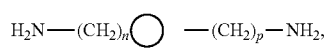
(II)

or the residues of an amino acid dimer of formula (III) below:

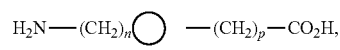
(III)

or a mixture thereof,
in which formulae, independently of each other:
n is from 1 to 10, in particular from 1 to 7,
p is from 1 to 10, in particular from 1 to 7,

corresponds to a structure chosen from:

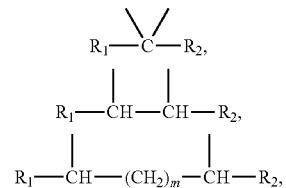

m being from 1 to 5,
  in which $R_1$ and $R_2$ represent, independently of each other, H or a $C_1$ to $C_{12}$ and in particular $C_7$ to $C_{11}$ alkyl chain,
and

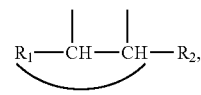

in which $R_1$ and $R_2$ are cyclized to form a structure:
i) with one ring of the type
cyclohexane:

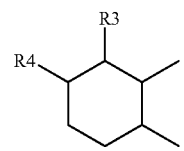

or phenyl:

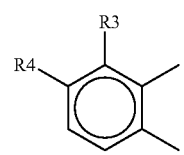

ii) with two rings of the 1,2,3,4-tetrahydronaphthalene type:

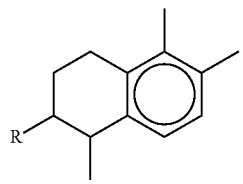

or of the bicyclo[4.4.0]decane type:

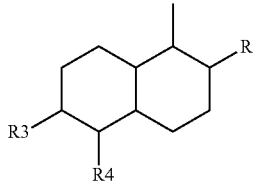

$R_3$ and $R_4$ being, in the one-ring or two-ring structures, C1 to C10 and in particular C7 to C9 alkyl residues, or a mixture thereof,
the total number of carbon atoms in the diacid of formula (I), the diamine of formula (II) and the amino acid of formula (III) being greater than or equal to 30, in particular greater than or equal to 36, in particular 36.

In one advantageous embodiment, the present invention relates to the use of a composition as defined above, in which:
said polyamide is formed from a semicrystalline copolyamide, and
said minor unit comprises the residues of a fatty acid dimer of formula (I) below:

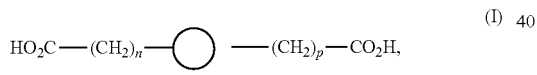 (I)

in which formula (I):
n is from 1 to 10, in particular from 1 to 7,
p is from 1 to 10, in particular from 1 to 7,

corresponds to a structure chosen from:

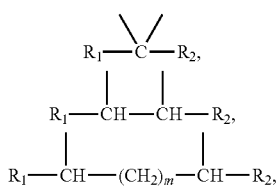

m being from 1 to 5,
in which $R_1$ and $R_2$ represent, independently of each other, H or a $C_1$ to $C_{12}$ and in particular $C_7$ to $C_{11}$ alkyl chain, and

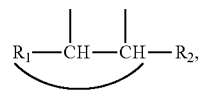

in which $R_1$ and $R_2$ are cyclized to form a structure:
i) with one ring of the type
cyclohexane:

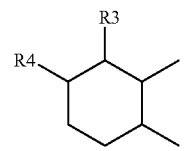

or phenyl:

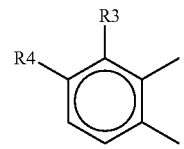

ii) with two rings of the 1,2,3,4-tetrahydronaphthalene type:

or of the bicyclo[4.4.0]decane type:

$R_3$ and $R_4$ being, in the one-ring or two-ring structures, C1 to C10 and in particular C7 to C9 alkyl residues, or a mixture thereof,
the total number of carbon atoms in the diacid of formula (I) being greater than or equal to 30, in particular greater than or equal to 36, in particular 36.

In one advantageous embodiment, the present invention relates to the use of a composition as defined above, in which the pipe is a hose pipe.

In one advantageous embodiment, the present invention relates to the use of a composition as defined above, in which the copolyamide is an aliphatic copolyamide.

The inventors have found, unexpectedly, that the presence of long aliphatic side chains grafted onto the main chain makes it possible to delay the moment at which hydrolytic degradation makes the PA fragile and brittle.

The importance of grafting of side chains onto the main chain should be noted. Specifically, the grafting of a side chain onto the nitrogen of the amino acid, lactam and diamine monomers leads to a composition with great sensitivity to hydrolysis.

In an advantageous embodiment, the present invention relates to the use of a composition as defined above, in which the viscosity in solution of the composition, as determined according to the standard ISO 307:2007 in m-cresol at a temperature of 20° C., is greater than 1, in particular greater than 1.2.

Advantageously, the polyamide of said composition whose viscosity is greater than 1, in particular greater than 1.2, has a balanced content of NH2 and COOH chain ends (the difference between these two functions will preferentially be less than 20 µeq/g of NH2 or COOH excess as determined by potentiometry).

In an advantageous embodiment, the present invention relates to the use of a composition as defined above, in which the Tm of the composition is greater than 170° C., as determined according to the standard ISO 11357-3:2013 at a rate of 20 K/min by DSC.

In an advantageous embodiment, the present invention relates to the use of a composition as defined above, in which at least one of the other units of said copolyamide is a unit A chosen from a unit obtained from a $C_6$ to $C_{12}$ amino acid, a unit obtained from a $C_6$ to $C_{12}$ lactam, and a unit corresponding to the formula (Ca aliphatic diamine).(Cb aliphatic diacid), with a representing the number of carbon atoms in the diamine and b representing the number of carbon atoms in the diacid, a and b each being between 4 and 36, especially between 4 and 22.

Advantageously, the mole proportion of said at least one minor unit in the semicrystalline copolyamide is from 1% to 20%, in particular from 1% to 10%, especially from 2% to 10% relative to the sum of all the units of said copolyamide.

A content of minor unit of greater than 20% is accompanied by lowering of the melting point and of the crystallinity, which may prove to be detrimental to the intended application.

A content of minor unit of less than 1% does not make it possible to obtain an improvement in the behavior on hydrolysis.

In an advantageous embodiment, the present invention relates to the use of a composition as defined above, in which:
said polyamide is formed from a semicrystalline copolyamide, and
said minor unit, in a mole proportion in the semicrystalline copolyamide of from 1% to 20%, in particular from 1% to 10%, especially from 2% to 10% relative to the sum of all the units of said copolyamide, comprises at least one of the following formulae:
either the residues of a fatty acid dimer of formula (I) below:

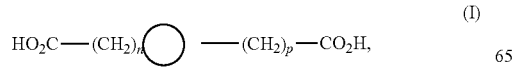

(I)

or the residues of a diamine dimer of formula (II) below:

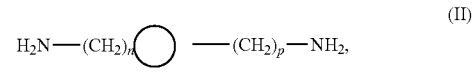

(II)

or the residues of an amino acid dimer of formula (III) below:

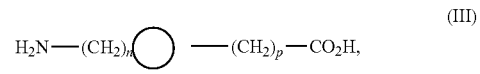

(III)

or a mixture thereof,
in which formulae, independently of each other:
n is from 1 to 10, in particular from 1 to 7,
p is from 1 to 10, in particular from 1 to 7,

corresponds to a structure chosen from:

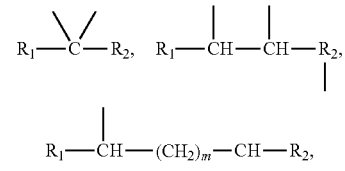

m being from 1 to 5,
in which $R_1$ and $R_2$ represent, independently of each other, H or a $C_1$ to $C_{12}$ and in particular $C_7$ to $C_{11}$ alkyl chain,
and

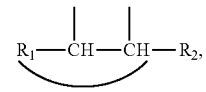

in which $R_1$ and $R_2$ are cyclized to form a structure:
i) with one ring of the type cyclohexane:

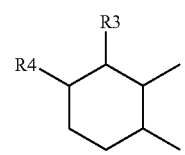

or phenyl:

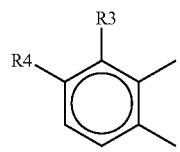

ii) with two rings of the 1,2,3,4-tetrahydronaphthalene type:

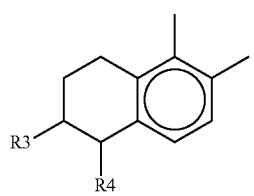

or of the bicyclo[4.4.0]decane type:

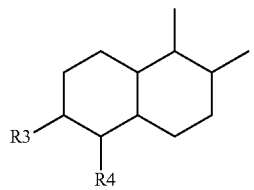

$R_3$ and $R_4$ being, in the one-ring or two-ring structures, C1 to C10 and in particular C7 to C9 alkyl residues, or a mixture thereof, the total number of carbon atoms in the diacid of formula (I), the diamine of formula (II) and the amino acid of formula (III) being greater than or equal to 30, in particular greater than or equal to 36, in particular 36, and at least one of the other units of said copolyamide is a unit A chosen from a unit obtained from a $C_6$ to $C_{12}$ amino acid, a unit obtained from a $C_6$ to $C_{12}$ lactam, and a unit corresponding to the formula (Ca aliphatic diamine).(Cb aliphatic diacid), with a representing the number of carbon atoms in the diamine and b representing the number of carbon atoms in the diacid, a and b each being between 4 and 36, especially between 4 and 22.

In an advantageous embodiment, the present invention relates to the use of a composition as defined above, in which:

said polyamide is formed from a semicrystalline copolyamide, and said minor unit, in a mole proportion in the semicrystalline copolyamide of from 1% to 20%, in particular from 1% to 10%, especially from 2% to 10% relative to the sum of all the units of said copolyamide, comprises residues of a fatty acid dimer of formula (I) below:

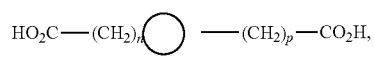

(I)

in which formula:

n is from 1 to 10, in particular from 1 to 7, p is from 1 to 10, in particular from 1 to 7,

corresponds to a structure chosen from:

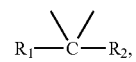

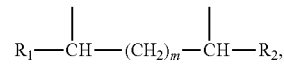

m being from 1 to 5, in which $R_1$ and $R_2$ represent, independently of each other, H or a $C_1$ to $C_{12}$ and in particular $C_7$ to $C_{11}$ alkyl chain, and

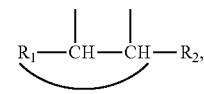

in which $R_1$ and $R_2$ are cyclized to form a structure:

i) with one ring of the type cyclohexane:

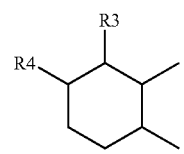

or phenyl:

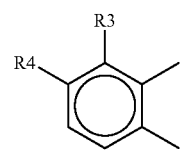

ii) with two rings of the 1,2,3,4-tetrahydronaphthalene type:

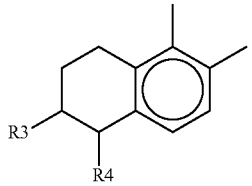

or of the bicyclo[4.4.0]decane type:

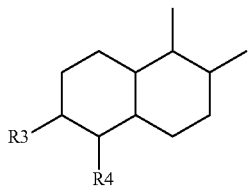

$R_3$ and $R_4$ being, in the one-ring or two-ring structures, C1 to C10 and in particular C7 to C9 alkyl residues, or a mixture thereof,
the total number of carbon atoms in the diacid of formula (I), the diamine of formula (II) and the amino acid of formula (III) being greater than or equal to 30, in particular greater than or equal to 36, in particular 36,
and at least one of the other units of said copolyamide is a unit A chosen from a unit obtained from a $C_6$ to $C_{12}$ amino acid, a unit obtained from a $C_6$ to $C_{12}$ lactam, and a unit corresponding to the formula (Ca aliphatic diamine).(Cb aliphatic diacid), with a representing the number of carbon atoms in the diamine and b representing the number of carbon atoms in the diacid, a and b each being between 4 and 36, especially between 4 and 22.

In an advantageous embodiment, the present invention relates to the use of a composition as defined above, in which the minor unit is a unit X.diacid of formula (I), X being an aliphatic diamine.

In an advantageous embodiment, the present invention relates to the use of a composition as defined above, in which

○ corresponds to

In an advantageous embodiment, the present invention relates to the use of a composition as defined above, in which the polymerized fatty acid comprises a fatty acid dimer in a proportion of at least 75% by weight, especially at least 92% by weight, in particular at least 95% by weight.

In an advantageous embodiment, the present invention relates to the use of a composition as defined above, in which:

said polyamide is formed from a semicrystalline copolyamide, and
said minor unit, in a mole proportion in the semicrystalline copolyamide of from 1% to 20%, in particular from 1% to 10%, especially from 2% to 10% relative to the sum of all the units of said copolyamide, comprises residues of a fatty acid dimer, in a proportion of at least 75% by weight, especially at least 92% by weight, in particular at least 95% by weight, of formula (I) below:

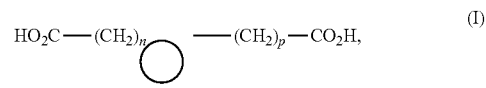

in which formula:
n is from 1 to 10, in particular from 1 to 7,
p is from 1 to 10, in particular from 1 to 7,

○ corresponds to a structure chosen from:

in which $R_1$ and $R_2$ represent, independently of each other, H or a $C_1$ to $C_{12}$ and in particular $C_7$ to $C_{11}$ alkyl chain,
the total number of carbon atoms in the diacid of formula (I), the diamine of formula (II) and the amino acid of formula (III) being greater than or equal to 30, in particular greater than or equal to 36, in particular 36,
and at least one of the other units of said copolyamide is a unit A chosen from a unit obtained from a $C_6$ to $C_{12}$ amino acid, a unit obtained from a $C_6$ to $C_{12}$ lactam, and a unit corresponding to the formula (Ca aliphatic diamine).(Cb aliphatic diacid), with a representing the number of carbon atoms in the diamine and b representing the number of carbon atoms in the diacid, a and b each being between 4 and 36, especially between 4 and 22.

Advantageously, the present invention relates to the use of a composition as defined above, in which the number of carbons in the diamine X is greater than 8, in particular equal to 10.

Advantageously, the unit A is the unit obtained from the polycondensation of a lactam or an amino acid, in particular chosen from PA11 and PA12.

Advantageously, the present invention relates to the use of a composition as defined above, in which the number of carbons in the diamine X is greater than 8, in particular equal to 10, and the unit A is the unit obtained from the polycondensation of a lactam or an amino acid, in particular chosen from PA11 and PA12.

Advantageously, the present invention relates to the use of a composition as defined above, in which the unit A is a unit obtained from the polycondensation of a Ca aliphatic diamine and a Cb aliphatic dicarboxylic acid, in particular the unit Ca+Cb>15, especially >19.

In the units A=CaCb and/or X.diacid of formula (I), independently of each other, up to 30 mol %, relative to the total amount of dicarboxylic acids, of the diacid Cb and/or diacid of formula (I) may be replaced with other aromatic, aliphatic or cycloaliphatic dicarboxylic acids comprising 6 to 36 carbon atoms, in particular 6 to 14 carbon atoms, and
- in the units A=CaCb and/or X.diacid of formula (I), independently of each other, up to 30 mol % of Ca and/or where appropriate of X, relative to the total amount of diamines, may be replaced with other diamines comprising from 4 to 36 carbon atoms, in particular 6 to 12 carbon atoms, and
- in the copolyamide, no more than 30 mol %, relative to the total amount of monomers, may be formed by lactams or aminocarboxylic acids, and
- on condition that the sum of the monomers which replace the diacid of formula (I), the diacid Cb, the diamine Ca and X does not exceed a concentration of 30 mol %, relative to the total amount of monomers used in the copolyamide, and
- on condition that none of the units Ca, Cb, X and diacid of formula (I) is totally substituted.

Advantageously, the present invention relates to the use of a composition as defined above, in which the number of carbons in the diamine X is greater than 8, in particular equal to 10, and the unit A is a unit obtained from the polycondensation of a Ca aliphatic diamine and a Cb aliphatic dicarboxylic acid, in particular the unit Ca+Cb>15, especially >19.

Advantageously, the unit A is chosen from PA614, PA618, PA1010, PA1012, PA1014, PA1018, PA1210, PA1212, PA1214 and PA1218.

In an advantageous embodiment, the present invention relates to the use of a composition as defined above, in which said composition comprises a polyamide chosen from an aliphatic, cycloaliphatic or aromatic polyamide, and said at least one semicrystalline polyamide.

Advantageously, said aliphatic or cycloaliphatic or aromatic polyamide is in a weight proportion of from 0.1% to 90%, especially from 0.1% to 80%, in particular from 0.1% to 50%.

Advantageously, said polyamide is an aliphatic or cycloaliphatic polyamide that is identical to the unit A of said semicrystalline polyamide.

Advantageously, the composition comprises two polyamides, one of which is the semicrystalline copolyamide comprising at least one minor unit.

Advantageously, the composition comprises two polyamides, one of which is an aliphatic homopolyamide and the other is the semicrystalline copolyamide comprising at least one minor unit; in particular, said aliphatic homopolyamide being in a weight proportion of from 0.1% to 90%, especially from 0.1% to 80%.

In an advantageous embodiment, the present invention relates to the use of a composition as defined above, in which the composition also comprises at least one polyolefin, in particular a functionalized polyolefin.

The polyolefin may be functionalized or non-functionalized, advantageously functionalized, or may be a mixture of at least one functionalized and/or of at least one non-functionalized polyolefin, in particular a mixture of at least one functionalized and of at least one non-functionalized polyolefin.

The term "polyolefin" means a polymer comprising olefin units, for instance ethylene, propylene, butene or octene units, or any other α-olefin.

Examples that may be mentioned include:
- polyethylenes such as LDPE, HDPE, LLDPE or VLDPE, polypropylene or alternatively metallocene polyethylenes;
- ethylene copolymers such as ethylene/propylene copolymers and ethylene/propylene/diene terpolymers; and
- copolymers of ethylene with at least one product chosen from unsaturated carboxylic acid salts or esters and saturated carboxylic acid vinyl esters;
- copolymers of acrylonitrile and of butadiene such as NBR.

In a particularly advantageous version of the invention, the polyolefin is an ethylene elastomeric copolymer.

Such an ethylene elastomeric copolymer is a compound obtained from at least two different monomers, including at least one ethylene monomer.

Preferably, this ethylene elastomeric copolymer is chosen from an ethylene/propylene copolymer (EPR), an ethylene/butylene copolymer, an ethylene/octene copolymer and an ethylene/alkyl (meth)acrylate copolymer.

The ethylene/propylene copolymer (EPR) is a well-known elastomeric copolymer, obtained from ethylene and propylene monomers. EPR or EPM is described especially in the publication Ullmann's Encyclopedia of Industrial Chemistry, fifth edition, volume A 23, pages 282 to 288, the content being incorporated into the present patent application.

The ethylene/butylene copolymer is obtained from ethylene and 1-butene monomers.

The ethylene/alkyl (meth)acrylate copolymer is obtained by radical polymerization of ethylene and of alkyl (meth)acrylate. The alkyl (meth)acrylate is preferably chosen from methyl (meth)acrylate, ethyl acrylate, n-butyl acrylate, isobutyl acrylate, octyl acrylate and 2-ethylhexyl acrylate.

The polyolefin used in the context of the present invention may be functionalized in the sense that it comprises at least one epoxy, anhydride or acid function, this function being introduced by grafting or by copolymerization.

The functionalized polyolefin may be chosen especially from functionalized ethylene/α-olefin copolymers and functionalized ethylene/alkyl (meth)acrylate copolymers.

The functionalized polyolefin may also be chosen from:
- copolymers of ethylene, of an unsaturated epoxide and optionally of an unsaturated carboxylic acid ester or salt or of a saturated carboxylic acid vinyl ester. They are, for example, ethylene/vinyl acetate/glycidyl (meth)acrylate copolymers or ethylene/alkyl (meth)acrylate/glycidyl (meth)acrylate copolymers,
- copolymers of ethylene, of an unsaturated carboxylic acid anhydride and/or of an unsaturated carboxylic acid which may be partially neutralized with a metal (Zn) or an alkali metal (Li) and optionally of an unsaturated carboxylic acid ester or of a saturated carboxylic acid vinyl ester. They are, for example, ethylene/vinyl acetate/maleic anhydride copolymers, ethylene/alkyl (meth)acrylate/maleic anhydride copolymers or ethylene/Zn or Li (meth)acrylate/maleic anhydride copolymers.

The density of the functionalized polyolefin may advantageously be between 0.86 and 0.965.

Advantageously, the polyolefin is functionalized with a carboxylic acid anhydride.

More preferentially, the functional polyolefin is chosen from an ethylene/propylene copolymer (EPR) grafted with maleic anhydride, an ethylene/butylene copolymer grafted with maleic anhydride, an ethylene/octene copolymer grafted with maleic anhydride and an ethylene/alkyl (meth) acrylate copolymer comprising a maleic anhydride function.

As examples of ethylene/alkyl (meth)acrylate copolymers comprising a maleic anhydride function, mention may be made of terpolymers of ethylene, of alkyl acrylate and of maleic anhydride, sold especially by the Applicant under the trade name Lotader®.

The polyolefin is present at from 0 to 25% by weight, advantageously from 0 to 15%, in particular from 2% to 10% by weight.

In one advantageous embodiment, said composition is free of polyolefin.

In another advantageous embodiment, said polyolefin is present in a mass proportion of from 2% to 10% in said composition.

In an advantageous embodiment, the present invention relates to the use of a composition as defined above, in which the composition also comprises at least one plasticizer.

The plasticizer is chosen from benzenesulfonamide derivatives, such as n-butylbenzenesulfonamide (BBSA); ethyltoluenesulfonamide or N-cyclohexyltoluenesulfonamide; hydroxybenzoic acid esters, such as 2-ethylhexyl para-hydroxybenzoate and 2-decylhexyl para-hydroxybenzoate; esters or ethers of tetrahydrofurfuryl alcohol, such as oligoethyleneoxytetrahydrofurfuryl alcohol; and esters of citric acid or of hydroxymalonic acid, such as oligoethyleneoxy malonate.

It would not be a departure from the scope of the invention to use a mixture of plasticizers.

The plasticizer that is particularly preferred is n-butylbenzenesulfonamide (BBSA).

The plasticizer may be introduced into the polyamide during the polycondensation or subsequently.

The plasticizer used in the composition is in a mass proportion of from 0 to 20%, in particular from 3% to 20%, especially from 5% to 13%.

In one advantageous embodiment, said composition is free of plasticizer.

In one advantageous embodiment, said composition is free of polyolefin and of plasticizer.

In another advantageous embodiment, said composition is free of plasticizer and said polyolefin is present in a mass proportion of from 2% to 10% in said composition.

In one advantageous embodiment, said plasticizer is in a mass proportion of from 3% to 20%, especially from 5% to 13% in said composition.

In another advantageous embodiment, said plasticizer is in a mass proportion of from 3% to 20%, especially from 5% to 13%, and said polyolefin is present in a mass proportion of from 2% to 10% in said composition.

In an advantageous embodiment, the present invention relates to the use of a composition as defined above, in which the composition also comprises at least one additive.

The additive is chosen from a catalyst, an antioxidant, a heat stabilizer, a UV stabilizer, a light stabilizer, a lubricant, a filler, a flame retardant, a nucleating agent, a chain extender and a dye.

The term "catalyst" denotes a polycondensation catalyst such as a mineral or organic acid.

Advantageously, the weight proportion of catalyst is from about 50 ppm to about 5000 ppm, in particular from about 100 to about 3000 ppm relative to the total weight of the composition.

Advantageously, the catalyst is chosen from phosphoric acid (H3PO4), phosphorous acid (H3PO3) and hypophosphorous acid (H3PO2), or a mixture thereof.

The antioxidant may especially be an antioxidant based on a copper complex of from 0.05% to 5% by weight, preferably from 0.05% to 1% by weight, preferably from 0.1% to 1%.

The term "copper complex" especially denotes a complex between a monovalent or divalent copper salt with an organic or inorganic acid and an organic ligand.

Advantageously, the copper salt is chosen from cupric (Cu(II)) salts of hydrogen halide, cuprous (Cu(I)) salts of hydrogen halide and aliphatic carboxylic acid salts.

In particular, the copper salts are chosen from CuCl, CuBr, CuI, CuCN, CuCl2, Cu(OAc)2 and cupric stearate.

Copper complexes are described especially in U.S. Pat. No. 3,505,285.

Said copper-based complex may also comprise a ligand chosen from phosphines, in particular triphenylphosphines, mercaptobenzimidazole, EDTA, acetylacetonate, glycine, ethylenediamine, oxalate, diethylenediamine, triethylenetetraamine, pyridine, diphosphone and dipyridyl or mixtures thereof, in particular triphenylphosphine and/or mercaptobenzimidazole.

The phosphines denote alkylphosphines, such as tributylphosphine, or arylphosphines such as triphenylphosphine (TPP).

Advantageously, said ligand is triphenylphosphine.

Examples of complexes and also of their preparation are described in patent CA 02347258.

Advantageously, the amount of copper in the composition of the invention is from 10 ppm to 1000 ppm by weight, especially from 20 ppm to 70 ppm, in particular from 50 to 150 ppm relative to the total weight of the composition.

In an advantageous embodiment, the present invention relates to the use of a composition as defined above, characterized in that said copper-based complex also comprises a halogenated organic compound.

The halogenated organic compound may be any halogenated organic compound.

Advantageously, said halogenated organic compound is a bromine-based compound and/or an aromatic compound.

Advantageously, said aromatic compound is chosen especially from decabromodiphenyl, decabromodiphenyl ether, bromo or chloro styrene oligomers, polydibromostyrene, tetrabromobisphenyl-A, tetrabisphenyl-A derivatives, such as the epoxy derivatives, and chloro dimethanedibenzo(a,e) cyclooctene derivatives, and mixtures thereof.

Advantageously, said halogenated organic compound is a bromine-based compound.

Said halogenated organic compound is added to the composition in a proportion of from 50 to 30 000 ppm by weight of halogen relative to the total weight of the composition, especially from 100 to 10 000, in particular from 500 to 1500 ppm.

Advantageously, the copper:halogen mole ratio is from 1:1 to 1:3000, especially from 1:2 to 1:100.

In particular, said ratio is from 1:1.5 to 1:15.

Advantageously, the antioxidant based on a copper complex is chosen from a Bruggolen® H3386, a Bruggolen® H3376, a Bruggolen® H3344 and a Bruggolen® H3350, in particular a Bruggolen® H3386.

It is also possible to use chain limiters as additives.

Examples of suitable chain regulators are monoamines, monocarboxylic acids, diamines, triamines, dicarboxylic acids, tricarboxylic acids, tetraamines, tetracarboxylic acids, and oligoamines or oligocarboxylic acids having in each case, respectively, 5 to 8 amino or carboxyl groups and in particular dicarboxylic acids, tricarboxylic acids or a mixture of dicarboxylic acids and of tricarboxylic acids. By way of example, it is possible to use dodecanedicarboxylic acid in dicarboxylic acid form and trimellitic acid as tricarboxylic acid.

Preferentially, said chain limiter will be different from a monofunctional chain limiter.

Preferably the additives of the polyamide of the composition of the invention are present in an amount of from 0 to 10%, in particular from 1% to 45% by weight relative to the total weight of the composition.

In an advantageous embodiment, the present invention relates to the use of a composition as defined above, in which the composition comprises, on a weight basis:
- 70% to 96% of said semicrystalline copolyamide optionally comprising from 0 to 70% by weight of another polyamide,
- 0 to 25% by weight, advantageously from 0 to 15%, in particular from 2% to 10% by weight, of a polyolefin comprising an epoxy, anhydride or acid function, introduced by grafting or by copolymerization, and
- 3% to 20% by weight, advantageously from 5% to 13% by weight, of a plasticizer,
- 0 to 10% by weight, in particular from 1% to 10%, of an additive.

The composition used in the context of the present invention is prepared by melt mixing of the various constituents in any mixing device, and preferably an extruder.

The composition is usually recovered in the form of granules.

According to another aspect, the present invention relates to a pipe, in particular a hose pipe, intended to be used in the exploitation of undersea (offshore) oil or gas deposits, comprising at least one leaktight layer (1) obtained from a composition as defined above.

In an advantageous embodiment, the present invention relates to a pipe, in particular a hose pipe as defined above, characterized in that it also comprises at least one second layer (2), which is not leaktight, formed from one or more metal elements, the second layer (2) being in contact with the oil or gas conveyed, the layer (1) being placed around the second layer (2) so as to ensure the leaktightness.

In an advantageous embodiment, the present invention relates to a pipe, in particular a hose pipe as defined above, characterized in that it also comprises at least one third layer (3) of metal or a composite material, the third layer (3) being placed around the layer (1) so as to compensate for the internal pressure of the oil or gas conveyed.

The term "composite material" means that said layer (3) is formed from at least one polyamide, which may be identical to or different from the polyamide of layer (1), also comprising continuous fibers chosen from:
- mineral fibers, in particular glass fibers,
- carbon fibers and carbon nanotubes,
- polymeric or polymer fibers,
- or mixtures of the abovementioned fibers.

Advantageously, said fibers are glass fibers or carbon fibers, especially glass fibers.

Advantageously, the proportion of continuous fibers is from 30% to 80% relative to the total weight of the composition.

Hose pipe as defined above, characterized in that it also comprises at least one fourth protective layer (4) placed around the layer (1) or, where appropriate, the third layer (3).

The protective layer may be a ply of metal fibers or of rubbers.

All the characteristics defined above in the "Use" paragraph are valid for the pipe comprising the composition of the invention.

According to another aspect, the present invention relates to a composition comprising, on a weight basis:
- 70% to 96% of a semicrystalline copolyamide as defined above, optionally comprising from 0 to 70% by weight of another polyamide,
- from 2% to 10% by weight of a polyolefin comprising an epoxy, anhydride or acid function, introduced by grafting or by copolymerization,
- from 3% to 20% by weight, advantageously from 5% to 13% by weight, of a plasticizer, and
- from 0 to 10% by weight, in particular from 1% to 10%, of an additive.

Advantageously, said other polyamide is an aliphatic polyamide, in particular PA11 or PA12.

Advantageously, said copolyamide of the composition defined above comprises at least one minor unit derived from the polycondensation:
- of at least one diamine with at least one polymerized fatty acid, in particular a fatty acid dimer, or
- of at least one diamine dimer with at least one dicarboxylic acid, or
- of at least one amino acid dimer,
- in particular derived from the polycondensation:
- of at least one diamine with at least one polymerized fatty acid, in particular a fatty acid dimer, or
- of at least one diamine dimer with at least one dicarboxylic acid,
- or mixtures thereof.

Advantageously, said minor unit of said copolyamide of the composition defined above is an X.diacid unit of formula (I), X being an aliphatic diamine.

The present invention will now be illustrated by examples of various compositions, the use of which forms the subject of the present invention, and also by various structures of hose pipes, also in accordance with the subject of the present invention.

The residual elongation is about twice as long for equivalent aging. The service life to reach an elongation at break of 50% (usual criterion) is markedly longer.

The extruded piece obtained with the formulated composition of the invention with Pripol 1009 thus has a resistance to hydrolysis that is very markedly improved relative to a piece obtained with a formulation based on PA11 or PA11/10T.

x axis: service life in hours
y axis: Elongation at break (%)

Figure 1:
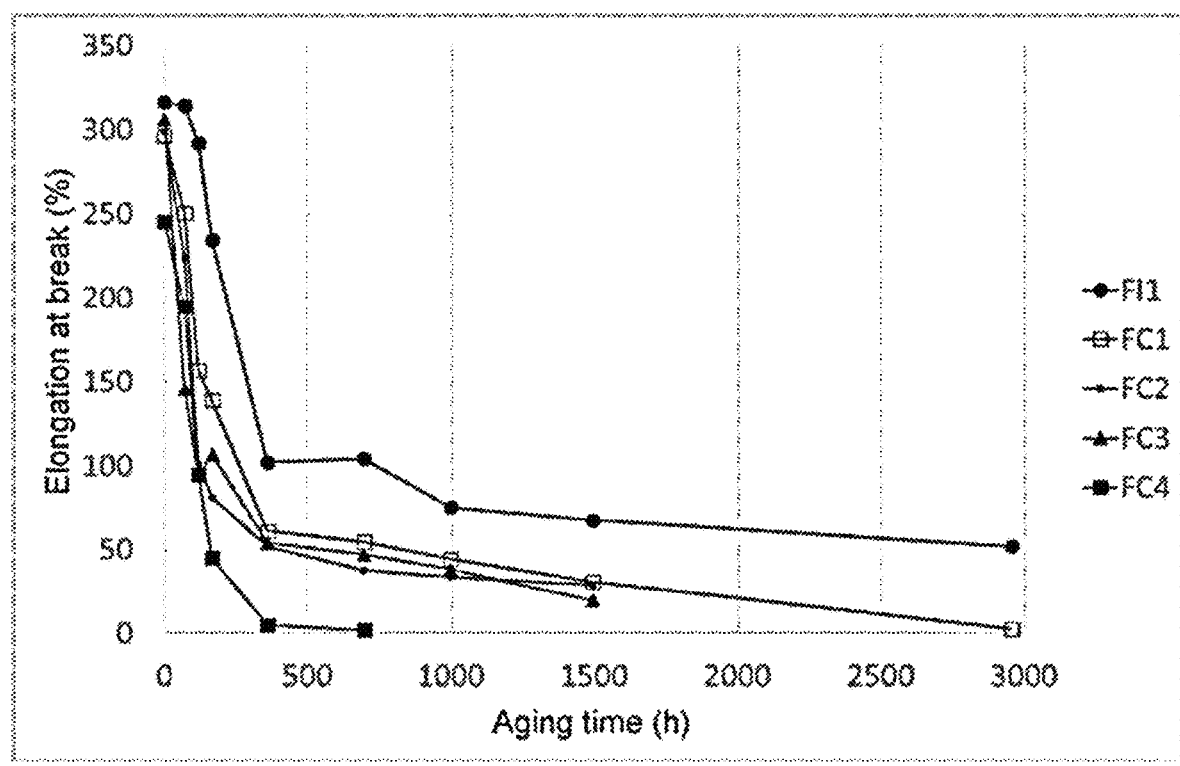
FIG. 1 represents the hydrolysis at 140° C. and pH 4 of extruded pieces obtained from various formulated compositions of table III and measured according to ASTM D638 type IV chopped into 6 mm strips.
Figure 2:
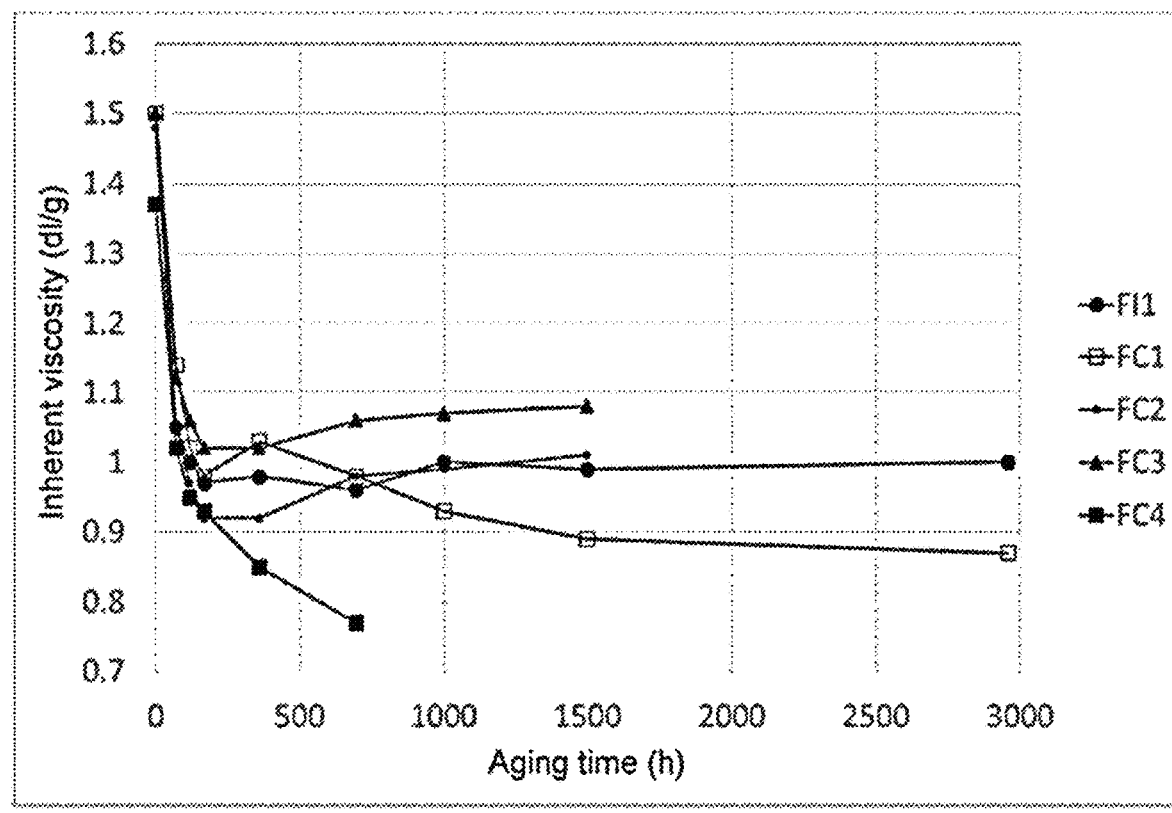

FIG. 2 shows the change in inherent viscosity as a function of the aging time measured during the hydrolysis test performed for FIG. 1.

Measurement of the inherent viscosity is performed in m-cresol according to the method well known to those skilled in the art. The standard ISO 307:2007 is followed, but changing the solvent (use of m-cresol instead of sulfuric acid), the temperature (20° C.) and the concentration (0.5% by mass).

This figure shows that the drop in viscosity is not a deciding factor for the mechanical properties of the various formulations, since the viscosities of said formulations all reach a plateau whose value is on the whole neither good nor poor (except for the formulation FC4). However, this criterion is not sufficiently revealing as regards the resistance to hydrolysis, since only the composition of the invention has these resistance properties, whereas the viscosity values at the plateau are substantially identical, with the exception of FC4.

In other words, it does not suffice to introduce a monomer which renders flexible in order to obtain good mechanical properties of a formulation.

x axis: aging time in hours
y axis: Inherent viscosity (dl/g)

Figure 3:
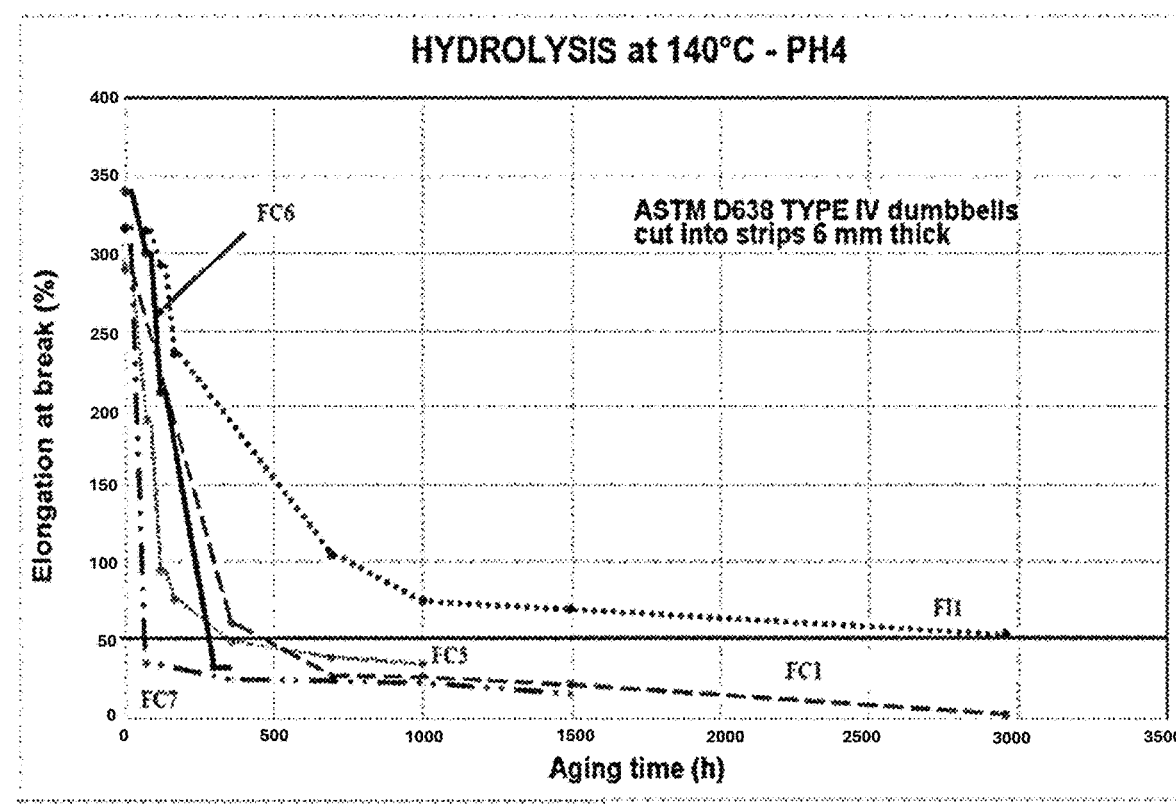

FIG. 3 represents the hydrolysis at 140° C. and pH 4 of extruded pieces obtained from various formulated compositions of table III and measured according to ASTM D638 type IV chopped into 6 mm strips.

x axis: aging time in hours
y axis: Elongation at break (%)

Figure 4:
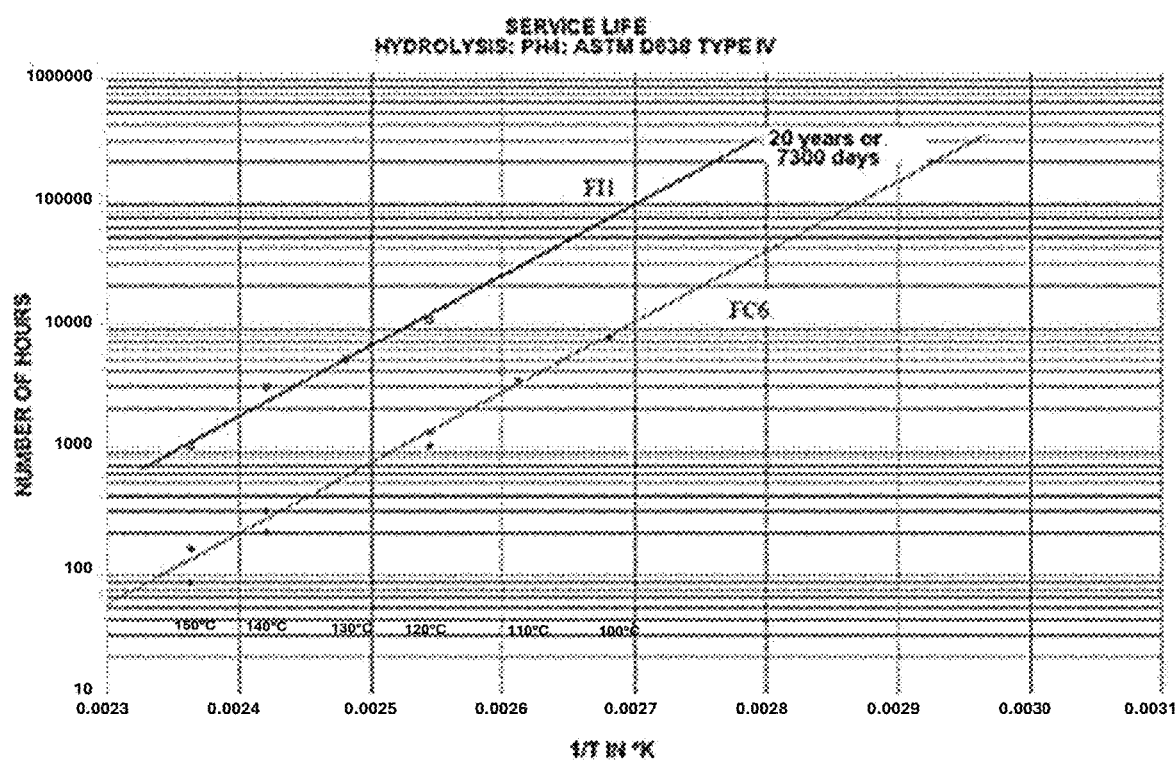

FIG. 4 shows the service life (hydrolysis at pH 4, ASTM D638 type IV) of the composition of the invention (FI1) compared with that of a prior art composition (FC6).

x axis: 1/T in ° K
y axis: Number of hours

This figure shows that the improvement in the service life temperature at 20 years is +20° C. for the composition of the invention compared with a PA11 of the prior art.

EXAMPLES

1. Preparation of a Polymer of the Composition of the Invention

The following compositions were prepared:

TABLE I

| | | | | Weighings | | |
|---|---|---|---|---|---|---|
| | | | | | I1 | |
| | | C1 | | C3 | PA11/10.Pripol | C4 |
| Polyamide and | PA11/10T | C2 | 11/BHMTA.10 | 1009 | PA11/NHAU | |
| Molar composition | 19/1 | PA11 | 200/1 | 19/1 | 6/1 | Unit |
| Terephthalic acid | 1.31 | — | — | — | — | kg |
| 11-Aminoundecanoic acid | 30.32 | 33 | 32.66 | 27.62 | 26.4 | kg |
| Decanediamine | 1.37 | — | — | 1.26 | — | kg |
| Sebacic acid | — | — | 0.25 | — | — | kg |
| Pripol 1009 | — | — | — | 4.12 | — | kg |
| BisHMTA | — | — | 0.17 | — | — | kg |
| N-Heptyl-11-aminoundecanoic acid | — | — | — | — | 6.6 | kg |
| Deionized water | 4 | 4 | 4 | 4 | 4 | kg |
| 85% H$_3$PO$_4$ | 23.3 | 23.3 | — | 23.3 | 23.3 | g |

BisHMTA: Bis(Hexamethylene)Triamine

The Pripol 1009 used has a hydroxyl number IOH=196 mg KOH/g, which gives an equivalent molar mass equal to 572.6 g/mol.

The Pripol 1009 is formed from: ≥98.5% of dimer, ≤1% of trimer, ≤1% of 1.5-mer and ≤0.1% of monomer.

NHAU: N-Heptyl-11-Aminoundecanoic Acid

The synthetic conditions were as follows:

After loading, the 100-liter autoclave reactor is deoxygenated by sequences of placing under nitrogen pressure followed by pressure release. The reactor contents are heated to 240° C. under the autogenous pressure and with stirring and then maintained for 1 hour under these conditions. The reactor is then depressurized to a pressure of 0.2 bar relative over 2 hours and then maintained for 30 minutes under these conditions (*). The polymer obtained is then discharged from the reactor in the form of rods and then in the form of granules.

(*) In the case of example C4, a step of polymerization at an absolute pressure of 250 mbar for 60 minutes is added.

In a similar manner to I1, I2 (PA11/10.Pripol 1009 9/1), I3 (PA11/10.Pripol 1009 25/1), I4 (PA11/10.Pripol 1009 30/1) and I5 (PA11/10.Pripol 1013 19/1) were synthesized.

The Pripol 1013 used has a hydroxyl number IOH=196 mg KOH/g.

The Pripol 1013 is formed from: ≥96% of dimer, ≤2.5% of trimer, ≤1.5% of 1.5-mer and ≤0.1% of monomer. The polymers have the following characteristics:

TABLE II

| Composition | C1 PA11/10T 19/1 | C2 PA11 | C3 11/BHMTA.10 200/1 | I1 PA11/10.Pripol 1009 19/1 | C4 PA11/NHAU 6/1 |
|---|---|---|---|---|---|
| Acidity (meq/g) | 0.056 | 0.057 | 0.069 | 0.056 | 0.066 |
| Basicity (meq/g) | 0.054 | 0.053 | 0.05 | 0.04 | 0.059 |
| Inherent viscosity m-cresol (dl/g) | 1.54 | 1.53 | 1.55 | 1.41 | 1.41 |
| Tm (° C.) | 176 | 191 | 190 | 174 | 166 |
| Tc (° C.) | 124 | 152 | 151 | 145 | 136 |
| Enthalpy of crystallization (J/g) | 45 | 63 | 61 | 48 | 50 |
| Tg (° C.) | 45 | 44 | 46 | 31 | 11 |

| Composition | I2 PA11/10.Pripol 1009 9/1 | I3 PA11/10.Pripol 1009 25/1 | I4 PA11/10.Pripol 1009 30/1 | I5 PA11/10.Pripol 1013 19/1 |
|---|---|---|---|---|
| Acidity (meq/g) | 0.049 | 0.055 | 0.059 | 0.059 |
| Basicity (meq/g) | 0.051 | 0.051 | 0.041 | 0.038 |
| Inherent viscosity m-cresol (dl/g) | 1.37 | 1.45 | 1.41 | 1.42 |
| Tm (° C.) | 168 | 181 | 181 | 178 |
| Tc (° C.) | 145 | 136 | 150 | 134 |
| Enthalpy of crystallization (J/g) | 51 | 52 | 58 | 55 |
| Tg (° C.) | 27 | 33 | 34 | 32 |

Measurement of the inherent viscosity is performed in m-cresol according to the standard ISO 307:2007, but with the solvent being changed (use of m-cresol instead of sulfuric acid) and the temperature being 20° C.

The enthalpy of crystallization of said matrix polymer is measured by differential scanning calorimetry (DSC) according to the standard ISO 11357-3:2013. The heating and cooling rate is 20° C./min.

The Tm and the Tc are measured by differential scanning calorimetry (DSC) according to the standard ISO 11357-3:2013. The heating and cooling rate is 20° C./min.

The Tg is measured by differential scanning calorimetry (DSC) according to the standard ISO 11357-2:2013. The heating and cooling rate is 20° C./min.

The Mn of the thermoplastic polymer is determined by titration (assay) of the end functions according to a potentiometric method (direct assay of the acids or bases).

2. Preparation of the Formulated Compositions

The following formulations were prepared (Table III):

TABLE III

| Reference | FC1 | Formulation Invention FI1 | FC3 | FC2 | FC4 | FC5 | FC6 |
|---|---|---|---|---|---|---|---|
| C1 | 82.8 | | | | | | |
| I1 | | 82.8 | | | | | |
| C2 | | | | 82.8 | | 88.8 | 87 |
| C3 | | | 82.8 | | | | |
| C4 | | | | | 98.8 | | |
| Exxelor VA 1801 | 10 | 10 | 10 | 10 | | 10 | |
| ANOX ® NDB TL89 | 1.2 | 1.2 | 1.2 | 1.2 | 1.2 | 1.2 | |
| BBSA | 6 | 6 | 6 | 6 | | | 13 |

| Reference | Formulation Invention FI2 | Formulation Invention FI3 | Formulation Invention FI4 | Formulation Invention FI5 |
|---|---|---|---|---|
| I2 | 82.8 | | | |
| I3 | | 82.8 | | |
| I4 | | | 82.8 | |
| I5 | | | | 82.8 |
| Exxelor VA 1801 | 10 | 10 | 10 | 10 |
| ANOX ® NDB TL89 | 1.2 | 1.2 | 1.2 | 1.2 |
| BBSA | 6 | 6 | 6 | 6 |

Anox ®NDB TL89: organic stabilizer of phenol phosphite type, sold by Chemtura.

The invention claimed is:

1. A leaktight layer in a pipe containing oil or gas, the pipe being configured for use in the exploitation of undersea oil or gas deposits, the leaktight layer comprising a composition comprising at least one polyamide, of which at least one of said polyamide is a semicrystalline copolyamide comprising at least one minor unit derived from the polycondensation:
   of at least one diamine with at least one polymerized fatty acid, or
   of at least one diamine dimer with at least one dicarboxylic acid, or
   of at least one amino acid dimer,
   or mixtures thereof,
   wherein the mole proportion of said at least one minor unit in the semicrystalline copolyamide is at least 1% relative to the sum of all the units of said copolyamide.

2. The leaktight layer as claimed in claim 1, in which said minor unit comprises at least one of the following formulae:
   either the residues of a fatty acid dimer of formula (I) below:

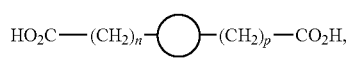
(I)

or the residues of a diamine dimer of formula (II) below:

(II)

or the residues of an amino acid dimer of formula (III) below:

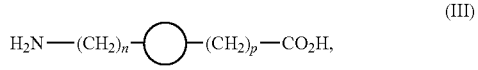
(III)

or a mixture thereof, in which formulae, independently of each other:

n is from 1 to 10, p is from 1 to 10,

corresponds to a structure chosen from:

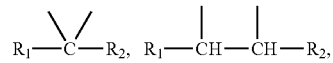

-continued

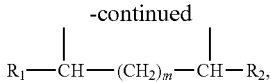

m being from 1 to 5,
in which $R_1$ and $R_2$ represent, independently of each other, H or a $C_1$ to $C_{12}$, and

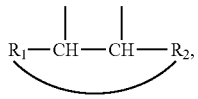

in which $R_1$ and $R_2$ are cyclized to form a structure:
i) with one ring of the type
cyclohexane:

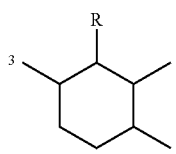

or phenyl:

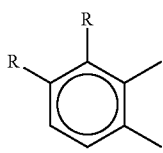

ii) with two rings of the 1,2,3,4-tetrahydronaphthalene type:

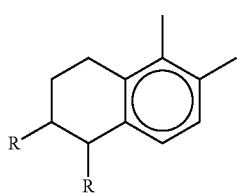

or of the bicyclo[4.4.0]decane type:

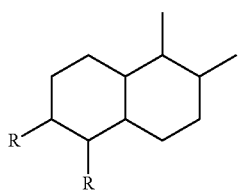

$R_3$ and $R_4$ being, in the one-ring or two-ring structures, C1 to C10 alkyl residues, or a mixture thereof,
the total number of carbon atoms in the diacid of formula (I), the diamine of formula (II) and the amino acid of formula (III) being greater than or equal to 30.

3. The leaktight layer as claimed in claim 1, in which the pipe is a hose pipe.

4. A leaktight layer in a pipe containing oil or gas, the pipe being configured for use in the exploitation of undersea oil or gas deposits, the leaktight layer comprising a composition comprising at least one polyamide, of which at least one of said polyamide is a semicrystalline copolyamide comprising at least one minor unit derived from the polycondensation:

of at least one diamine with at least one polymerized fatty acid, or of at least one diamine dimer with at least one dicarboxylic acid, or of at least one amino acid dimer, or mixtures thereof, in which the copolyamide is an aliphatic copolyamide.

5. The leaktight layer as claimed in claim 1, in which the viscosity in solution of the composition, as determined according to the standard ISO 307:2007 in m-cresol at a temperature of 20° C., is greater than 1.

6. The leaktight layer as claimed in claim 1, in which the Tm of the composition is greater than 170° C., as determined according to the standard ISO 11357-3:2013 at a rate of 20 K/min by DSC.

7. The leaktight layer as claimed in claim 1, in which at least one of the other units of said copolyamide is a unit A chosen from a unit obtained from a $C_6$ to $C_{12}$ amino acid, a unit obtained from a $C_6$ to $C_{12}$ lactam, and a unit corresponding to the formula (Ca aliphatic diamine).(Cb aliphatic diacid), with a representing the number of carbon atoms in the diamine and b representing the number of carbon atoms in the diacid, a and b each being between 4 and 22.

8. The leaktight layer as claimed in claim 1, in which the mole proportion of said at least one minor unit in the semicrystalline copolyamide is from 1% to 20% relative to the sum of all the units of said copolyamide.

9. The leaktight layer as claimed in claim 1, in which said minor unit is an X.diacid unit of formula (I), X being an aliphatic diamine.

10. The leaktight layer as claimed in claim 9, in which

◯ corresponds to $R_1$—CH—CH—$R_2$.

11. The leaktight layer as claimed in claim 9, in which the polymerized fatty acid comprises a fatty acid dimer in a proportion of at least 75% by weight.

12. The leaktight layer as claimed in claim 9, in which the number of carbons in the diamine X is greater than 8.

13. A leaktight layer in a pipe containing oil or gas, the pipe being configured for use in the exploitation of undersea oil or gas deposits, the leaktight layer comprising a composition comprising at least one polyamide, of which at least one of said polyamide is a semicrystalline copolyamide comprising at least one minor unit derived from the polycondensation:

of at least one diamine with at least one polymerized fatty acid, or of at least one diamine dimer with at least one dicarboxylic acid, or of at least one amino acid dimer, or mixtures thereof, in which at least one of the other units of said copolyamide is a unit A chosen from a unit obtained from a $C_6$ to $C_{12}$ amino acid, a unit obtained from a $C_6$ to $C_{12}$ lactam, and a unit corresponding to the formula (Ca aliphatic diamine).(Cb aliphatic diacid), with a representing the number of carbon atoms in the diamine and b representing the number of carbon atoms in the diacid, a and b each being between 4 and 22, in which the unit A is a unit obtained from the polycondensation of a lactam or an amino acid.

14. A leaktight layer in a pipe containing oil or gas, the pipe being configured for use in the exploitation of undersea oil or gas deposits, the leaktight layer comprising a composition comprising at least one polyamide, of which at least one of said polyamide is a semicrystalline copolyamide comprising at least one minor unit derived from the polycondensation:

of at least one diamine with at least one polymerized fatty acid, or of at least one diamine dimer with at least one dicarboxylic acid, or of at least one amino acid dimer, or mixtures thereof, in which at least one of the other units of said copolyamide is a unit A chosen from a unit obtained from a $C_6$ to $C_{12}$ amino acid, a unit obtained from a $C_6$ to $C_{12}$ lactam, and a unit corresponding to the formula (Ca aliphatic diamine).(Cb aliphatic diacid), with a representing the number of carbon atoms in the diamine and b representing the number of carbon atoms in the diacid, a and b each being between 4 and 22, in which the unit A is a unit obtained from the polycondensation of a Ca aliphatic diamine and a Cb aliphatic dicarboxylic acid.

15. The leaktight layer as claimed in claim 14, in which the unit A is chosen from PA614, PA618, PA1010, PA1012, PA1014, PA1018, PA1210, PA1212, PA1214 and PA1218.

16. The leaktight layer as claimed in claim 1, in which the composition comprises a polyamide chosen from an aliphatic, cycloaliphatic or aromatic polyamide, and said at least one semicrystalline polyamide.

17. The leaktight layer as claimed in claim 16, in which said polyamide is an aliphatic or cycloaliphatic polyamide that is identical to the unit A of said semicrystalline polyamide.

18. The leaktight layer as claimed in claim 1, in which the composition further comprises at least one polyolefin.

19. The leaktight layer as claimed in claim 1, in which the composition further comprises at least one plasticizer.

20. The leaktight layer as claimed in claim 1, in which the composition further comprises at least one additive.

21. The leaktight layer as claimed in claim 1, in which the composition comprises, on a weight basis: 70% to 96% of said semicrystalline copolyimide, and optionally comprising from 0 to 70% by weight of another polyamide, 0 to 25% by weight of a polyolefin comprising an epoxy, anhydride or acid function, introduced by grafting or by copolymerization, and 3% to 20% by weight of a plasticizer, 0 to 10% by weight of an additive.

22. A pipe configured to be used in the exploitation of undersea oil or gas deposits, comprising the leaktight layer as claimed in claim 1.

23. The pipe as claimed in claim 22, wherein the pipe further comprises at least one second layer, which is not leaktight, formed from one or more metal elements, the second layer being in contact with the oil or gas conveyed, the leaktight layer being placed around the second layer so as to ensure the leaktightness.

24. The pipe as claimed in claim 22, wherein the pipe further comprises at least one third layer of metal or a composite material, the third layer being placed around the leaktight layer so as to compensate for the internal pressure of the oil or gas conveyed.

25. The hose pipe as claimed in claim 24, wherein the pipe further comprises at least one fourth protective layer placed around the leaktight layer or, where appropriate, a third layer which is placed around the leaktight layer.

26. A composition comprising, on a weight basis:

70% to 96% of a semicrystalline copolyamide, optionally comprising from 0 to 70% by weight of another polyamide, from 2% to 10% by weight of a polyolefin comprising an epoxy, anhydride or acid function, introduced by grafting or by copolymerization, from 3% to 20% by weight of a plasticizer, and from 0 to 10% by weight of an additive, wherein the semicrystalline copolyamide comprises at least one minor unit derived from the polycondensation:

of at least one diamine with at least one polymerized fatty acid, or of at least one diamine dimer with at least one dicarboxylic acid, or of at least one amino acid dimer, or mixtures thereof, wherein the mole proportion of said at least one minor unit in the semicrystalline copolyamide is at least 1% relative to the sum of all the units of said copolyamide.

27. The composition as claimed in claim 26, in which said another polyamide is an aliphatic polyamide.

28. The composition as claimed in claim 26, in which said minor unit comprises at least one of the following formulae:

either the residues of a fatty acid dimer of formula (I) below:

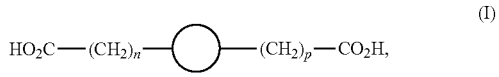

or the residues of a diamine dimer of formula (II) below:

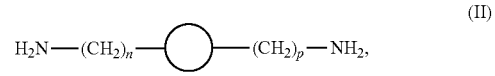

or the residues of an amino acid dimer of formula (III) below:

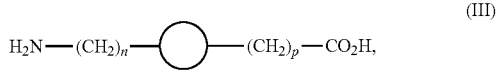

or a mixture thereof,
in which formulae, independently of each other:
n is from 1 to 10,
p is from 1 to 10,

corresponds to a structure chosen from:

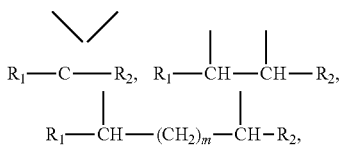

m being from 1 to 5,
in which $R_1$ and $R_2$ represent, independently of each other, H or a $C_1$ to $C_{12}$, and

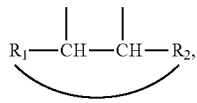

in which $R_1$ and $R_2$ are cyclized to form a structure:
  i) with one ring of the type cyclohexane:

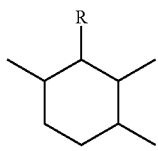

or phenyl:

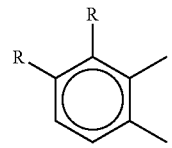

ii) with two rings of the 1,2,3,4-tetrahydronaphthalene type:

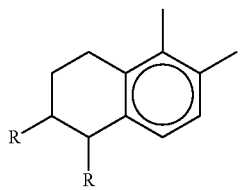

or of the bicyclo[4.4.0]decane type:

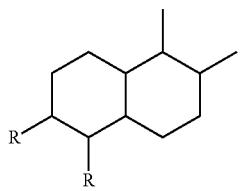

$R_3$ and $R_4$ being, in the one-ring or two-ring structures, $C_1$ to $C_{10}$ alkyl residues, or a mixture thereof,
the total number of carbon atoms in the diacid of formula (I), the diamine of formula (II) and the amino acid of formula (III) being greater than or equal to 30.

29. The composition as claimed in claim 26, in which said minor unit is an X.diacid unit of formula (I), X being an aliphatic diamine.

* * * * *